United States Patent
Jeon et al.

(10) Patent No.: US 10,864,468 B2
(45) Date of Patent: Dec. 15, 2020

(54) WATER PURIFIER

(71) Applicant: LG ELECTRONICS INC., Seoul (KR)

(72) Inventors: Jewook Jeon, Seoul (KR); Kobong Choi, Seoul (KR); Yonghyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 124 days.

(21) Appl. No.: 15/586,529

(22) Filed: May 4, 2017

(65) Prior Publication Data

US 2017/0319990 A1    Nov. 9, 2017

(30) Foreign Application Priority Data

May 4, 2016   (KR) .................... 10-2016-0055454

(51) Int. Cl.
*B67D 1/08* (2006.01)
*B67D 1/00* (2006.01)
(Continued)

(52) U.S. Cl.
CPC .......... *B01D 35/153* (2013.01); *B01D 29/60* (2013.01); *B01D 35/1573* (2013.01); *B67D 1/0009* (2013.01); *B67D 1/0014* (2013.01); *B67D 1/0082* (2013.01); *B67D 1/0857* (2013.01); *B67D 1/0864* (2013.01); *B67D 1/0878* (2013.01); *B67D 1/0884* (2013.01); *B67D 1/0895* (2013.01); *B67D 1/125* (2013.01); *B67D 1/1256* (2013.01); *B67D 1/1281* (2013.01); *B67D 1/14* (2013.01); *C02F 1/001* (2013.01); *C02F 1/003* (2013.01); *B01D 2201/167* (2013.01); *B67D 1/0888* (2013.01); *B67D 2001/0093* (2013.01); *B67D 2210/0001* (2013.01); *B67D 2210/00031* (2013.01);
(Continued)

(58) Field of Classification Search
CPC ............................ B67D 1/0857; B67D 1/0895
See application file for complete search history.

(56) References Cited

U.S. PATENT DOCUMENTS

| 2003/0015242 A1* | 1/2003 | Kwak | .................. B67D 1/1466 137/613 |
| 2012/0061382 A1* | 3/2012 | Yang | ..................... H05B 6/108 219/628 |
| 2014/0239521 A1* | 8/2014 | Ergican | ................ B67D 1/0058 261/115 |

FOREIGN PATENT DOCUMENTS

| CN | 204561839 | 8/2015 |
| KR | 20110008627 | 1/2011 |

OTHER PUBLICATIONS

Chinese Office Action in Chinese Application No. 201710202061.X, dated Feb. 6, 2020, 18 pages (with English translation).

* cited by examiner

*Primary Examiner* — Patrick Orme
(74) *Attorney, Agent, or Firm* — Fish & Richardson P.C.

(57) ABSTRACT

A water purifier that includes: a filter unit that is configured to purify water; a cooling unit that is configured to cool water purified by the filter unit using cooling water; a water discharge unit that is configured to discharge water cooled by the cooling unit; a cold water flow path that couples the cooling unit to the water discharge unit and through which water cooled by the cooling unit passes; a cold water discharge valve that is coupled to a first side of the cooling unit and that is configured to control water flow inside the cold water flow path; and a check fitting unit that is coupled to a first side of the water discharge unit and that is configured to block pressure change inside the cold water flow path is disclosed.

20 Claims, 11 Drawing Sheets

(51) Int. Cl.
  *B01D 35/153* (2006.01)
  *B67D 1/12* (2006.01)
  *B67D 1/14* (2006.01)
  *C02F 1/00* (2006.01)
  *B01D 29/60* (2006.01)
  *B01D 35/157* (2006.01)

(52) U.S. Cl.
  CPC .............. *B67D 2210/00044* (2013.01); *B67D 2210/00047* (2013.01); *B67D 2210/00065* (2013.01); *B67D 2210/00118* (2013.01); *C02F 2201/005* (2013.01); *C02F 2209/40* (2013.01); *C02F 2209/44* (2013.01); *C02F 2307/10* (2013.01)

WATER PURIFIER

CROSS-REFERENCE TO RELATED APPLICATION

Pursuant to 35 U.S.C. § 119(a), this application claims the benefit of earlier filing date and right of priority to Korean Application No. 10-2016-0055454, filed on May 4, 2016, the contents of which is incorporated by reference herein in its entirety.

TECHNICAL FIELD

The present application generally relates to technologies about a water purifier.

BACKGROUND

A water purifier is a device that provides safe and clean water by filtering harmful material included in raw water such as tap water or underground water through filters of several steps installed in a water purifier main body.

To this end, a water purifier is a device that forms a cold water path, a hot water path and a purified water path so as to supply purified water to a water discharge unit upon a user's selection, and controls a water flow by a mechanical or an electronic valve.

The water purifier is divided into a water tank type and a direct water type according to whether a water tank is provided or not. The water tank type water purifier is configured to supply purified water which is stored in a water tank when a user operates the water discharge unit, while storing purified water in the water tank. In contrast, the direct water type water purifier is configured to supply purified water to a user by immediately purifying raw water when a user operates the water discharge unit, without a water tank. As the direct water type water purifier is recognized as sanitary and it can save water, compared to the water tank type purifier, the user's preference with respect to the direct water type purifier has recently been increased.

The water purifier may supply hot water and cold water besides normal temperature water. The water purifier supplying hot water and cold water may be provided therein with a heating device and a cooling device, separately. The heating device is configured to produce hot water by heating purified water and the cooling device is configured to produce cold water by cooling purified water.

SUMMARY

In general, one innovative aspect of the subject matter described in this specification can be embodied in a water purifier comprising: a filter unit that is configured to purify water; a cooling unit that is configured to cool water purified by the filter unit using cooling water; a water discharge unit that is configured to discharge water cooled by the cooling unit; a cold water flow path that couples the cooling unit to the water discharge unit and through which water cooled by the cooling unit passes; a cold water discharge valve that is coupled to a first side of the cooling unit and that is configured to control water flow inside the cold water flow path; and a check fitting unit that is coupled to a first side of the water discharge unit and that is configured to block pressure change inside the cold water flow path.

The foregoing and other embodiments can each optionally include one or more of the following features, alone or in combination. In particular, one embodiment includes all the following features in combination. The check fitting unit includes: a first check valve that is configured to block water flow inside the cold water flow path. The water purifier further includes a cooling water tank assembly that is coupled to the cooling unit and that is configured to store cooling water to cool water purified by the filter unit. The water purifier further includes: a purified water flow path that couples the filter unit to the water discharge unit and through which water purified by the filter unit passes; a hot water tank assembly that is configured to store hot water; an induction heater that includes a working coil and that is configured to inductively heat water in the hot water tank assembly using the working coil; and a hot water flow path that couples a first portion of the purified water flow path to the water discharge unit and through which hot water heated by the hot water tank assembly passes. The water purifier further includes: a second check valve that is coupled to a second portion of the purified water flow path and that is configured to control water flow inside the purified water flow path. The cold water flow path couples a third portion of the purified water flow path to the water discharge unit. The third portion of the purified water flow path is closer to the water discharge unit than the first portion of the purified water flow path. The second portion of the purified water flow path is located between the first portion of the purified water flow path and the third portion of the purified water flow path. The water discharge unit includes: a faucet body; a first faucet part that is located inside the faucet body and that is coupled to the cold water flow path or the purified water flow path; and a second faucet part that is located inside the faucet body and that is coupled to the hot water flow path. The water purifier further includes: a control module that is configured to control a frequency of the induction heater to control a discharge temperature of hot water. The water purifier further includes: a water supplying valve (i) that is configured to control a flow of water that is purified by the filter unit and (ii) that is located at a first side of the filter unit. The water purifier further includes: a purified water discharge valve that is coupled to the purified water flow path and that is configured to control water flow inside the purified water flow path. The control module is configured to control timings to open or close the water supplying valve, the purified water discharge valve, and the cold water discharge valve. The control module is configured to (i) close the water supplying valve earlier than closure of the purified water discharge valve or the cold water discharge valve and (ii) open the water supplying valve later than opening of the purified water discharge valve or the cold water discharge valve. The first side of the filter unit is an output side of the filter unit. The cooling unit includes a cooling coil. The first side of the cooling unit is an input side of the cooling unit. The first side of the water discharge unit is an input side of the water discharge unit.

In general, another innovative aspect of the subject matter described in this specification can be embodied in a water purifier that includes: a water supply flow path that is configured to guide water and through which water is provided; a filter unit that is coupled to the water supply flow path and that is configured to purify water provided from the water supply flow path; a purified water flow path that is coupled to the filter unit and that is configured to guide water purified by the filter unit; a cold water flow path that is coupled to the purified water flow path and that is configured to guide a first portion of water from the purified water flow path, a hot water flow path that is coupled to the purified water flow path and that is configured to guide a second portion of water from the purified water flow path; a coupling part (i) that is coupled to the purified water flow path, the cold water flow path, and an output water flow path, (ii) that is configured to receive water from the purified water flow path or the cold water flow path and provide water to the output water flow path; and a water discharge faucet that accommodates the output water flow path and the hot water flow path.

The foregoing and other embodiments can each optionally include one or more of the following features, alone or in combination. In particular, one embodiment includes all the following features in combination. The water purifier further includes: a first check valve (i) that is coupled to a portion of the purified water flow path, the portion of the purified water flow path being a portion that the purified water flow path is coupled to the cold water flow path, and (ii) that is configured to control water flow inside the purified water flow path; and a second check valve that is coupled to the output water flow path and that is configured to control water flow inside the output water flow path.

The subject matter described in this specification can be implemented in particular embodiments so as to realize one or more of the following advantages. Comparing to a conventional water purifier, a water purifier includes a check fitting unit that is located at one side of a water discharge faucet. This check fitting unit selectively separates water flow between a water discharge faucet and a cold water flow path. As a result, residual water remained in the water discharge faucet is not affected by pressure change of the cold water flow path such that it can prevent the residual water from being dropped.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

Figure 1:
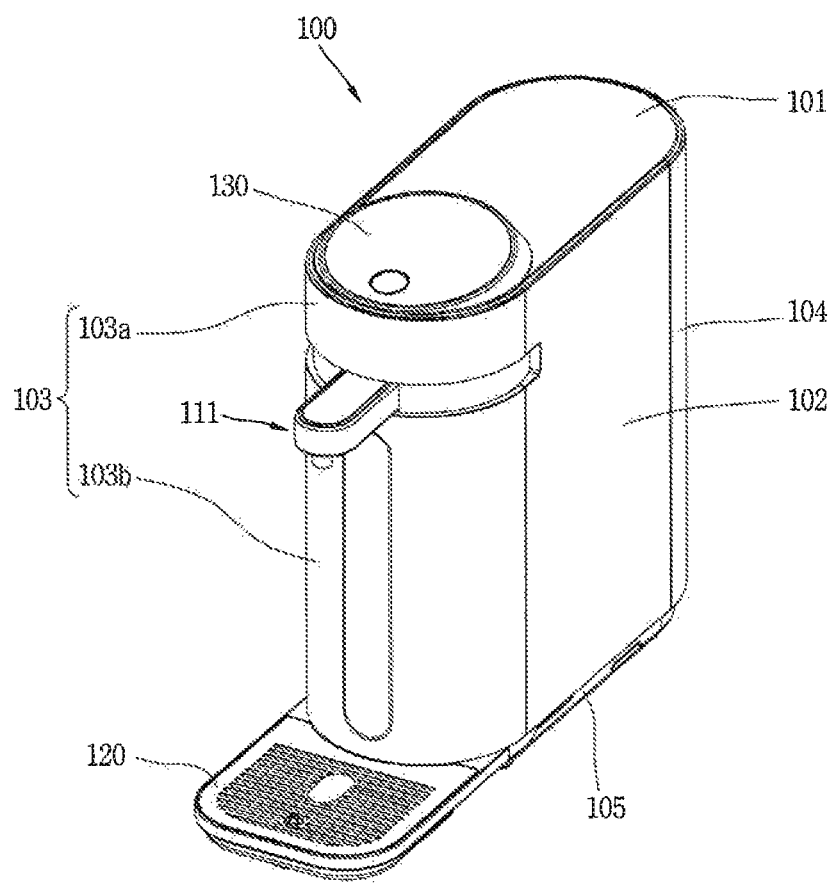
FIGS. 1 and 2 are diagrams illustrating an example water purifier.

FIG. 1 illustrates an example water purifier.

The water purifier may include a main body 100, a water discharge unit 111, and a residual water tray 120.

The main body 100 forms an appearance of a water purifier. To form an appearance of the water purifier, the main body 100 may include a top cover 101, a side cover 102, a front cover 103, a rear cover 104 and a base cover 105.

The top cover 101 may be formed in a plate type and may form an upper part of the main body 100.

The side cover 102 may be formed in a plate type and may form a left side surface and a right side surface of the main body 100, respectively. To this end, the side covers 102 may be vertically disposed to face each other in the left and right side surfaces.

The front cover 103 may form a front surface of the main body 100. The front cover 103 may be formed in a semi-circular curved surface having a predetermined curvature.

The rear cover 104 may form a rear surface of the main body 100. The rear cover 104 may be formed in a semicircular curved surface having a predetermined curvature.

In this example, the front cover 103 and the rear cover 104 may be symmetrically disposed so as to face each other at a front side and a rear side of the main body 100. The front side surface of the main body 100 represents a surface that the water discharging unit 111 is disposed so that a user can take water from the front side of the water purifier.

The base cover 106 may form a bottom of the main body 100.

To form a closed accommodation space within the main body 100, the front cover 101, the side cover 102 and the rear cover 104 are disposed at front, left and right and rear sides of the main body, respectively, along the edge of the main body 100 and coupled with each other edge by edge. Further, the top cover 102 may be coupled to the front cover 103, the side cover 102 and the rear cover 104 edge by edge at the top portions thereof so as to cover the top of the accommodation space.

The main body 100 may be formed to have a narrow width at its left and right sides in a slim configuration. The width of the left and right sides of the water purifier may be formed to be shorter than that of the front and rear sides of the water purifier. A distance between the side covers 102 may be shorter than that between the front cover 103 and the rear cover 104. According to this, it is possible to broadly utilize the space around a kitchen where the water purifier is furnished.

In some implementations, a water purifier can have a slim sized configuration. For example, the water purifier can include a single water discharge port 111. When the cold water and hot water discharge ports are formed to be spaced apart from each other at left and right, the size of the water purifier may be larger than that of the water purifier to secure a space between the cold water and hot water discharging ports.

An operation panel 130 is rotatably disposed at a front side of the top cover 101.

The operation panel 130 may be operated by a user to discharge purified water, cold water and hot water. Further, the operation panel 130 may include a display unit to display functions selected by a user.

The operation panel 130 may include a touch type button that performs various functions according to a user's operation.

For instance, the touch type button may include a power button to turn on or off the power, a purified water button to discharge purified water, a cold water button to discharge cold water, a hot water button to discharge hot water, a temperature control button to control temperatures of the cold water or the hot water, and a continuation button to continuously discharge water for a predetermined time.

The display unit may display the operation state of the function that is selected by a user simultaneously with pressing a button for desired function by illuminating light from the corresponding button. Further, numerals or colors, for instance, red, yellow, red-yellow, or the like, indicating various temperatures may be displayed according to manipulation of the temperature control button.

The continuation button may be configured such that when a user desires to take a large amount of water according to a water vessel, for instance, for more than one minute to three minutes, water may be discharged continuously for the predetermined time with one touch without pressing a water discharge button for a long time. Further, when the continuation button is touched again after taking water as much as desired by pressing the continuation button, the function for continuation button may be released.

The operation panel 130 may be formed to be rotatable in a circular shape, and may be formed to have a rear surface higher than a front surface to meet a user's eyes so as to promptly transmit information about the water purifier. For instance, an inclination angle of the operation panel 130 may be determined at a range of 1°-30°.

A water discharge button 131 for discharging purified water, cold water and hot water may be disposed on one spot of a center of a front surface of the operation panel 130, or at several spots so as to be spaced apart from one another at a front surface or a rear surface of the operation panel 130. Other buttons or display units for operating various functions may be disposed on various positions of the operation panel 130.

The water discharge port 111 may be forwardly protruded from the front cover 103 and may be rotatably disposed.

The water discharge port 111 may be disposed at a lower portion of the operation panel 130. The water discharge port 111 may be disposed at an upper portion of the front cover 103 so as to be rotatable in left and right directions. The water discharge port 111 may be manually operated.

In some implementations, the main body 100 can be located near a front side of a sink for user's accessibility. In these implementations, the water discharge port 111 may be protruded forwardly from a front portion of the sink.

In some implementations, the water discharge port 111 is fixed in position. In some other implementations, the water discharge port 111 may be disposed so as to be rotatable, e.g., rotatable horizontally, in order to avoid interference with user's movements.

In some implementations, a user may use the water discharge port 111 from a front side of the water discharge port 111 to drink water. In these implementations, the water discharge port 111 can be rotated together with the operation panel 130. This can improve user's visibility to the operational panel 130.

For example, to rotate the water discharge port 111 together with the operation panel 130, the operation panel 130 can be coupled to the water discharge port 111.

A coupling protrusion that couples the operation panel 130 to the water discharge port 111 may be provided within the front cover 103.

A residual water tray 120 may be configured to collect dropped water when a user tried to drink water using a vessel like a cup and water is dropped down without being introduced into the vessel.

The residual water tray 120 may be rotatably disposed at one end, e.g., a front end, of the base cover 105 so as to collect water that is dropped from the water discharge port 111 by rotating the residual water tray 120 in the same direction as the water discharge port 111. The residual water tray 120 may be rotatable in left and right directions independently of the water discharge port 111.

The operation panel 130, the water discharge port 111 and the residual water tray 120 may be consecutively rotated at a range from −90° to the left to +90° to the right (totally 180°) based on a center line of left and right directions of the main body 100.

Figure 2:
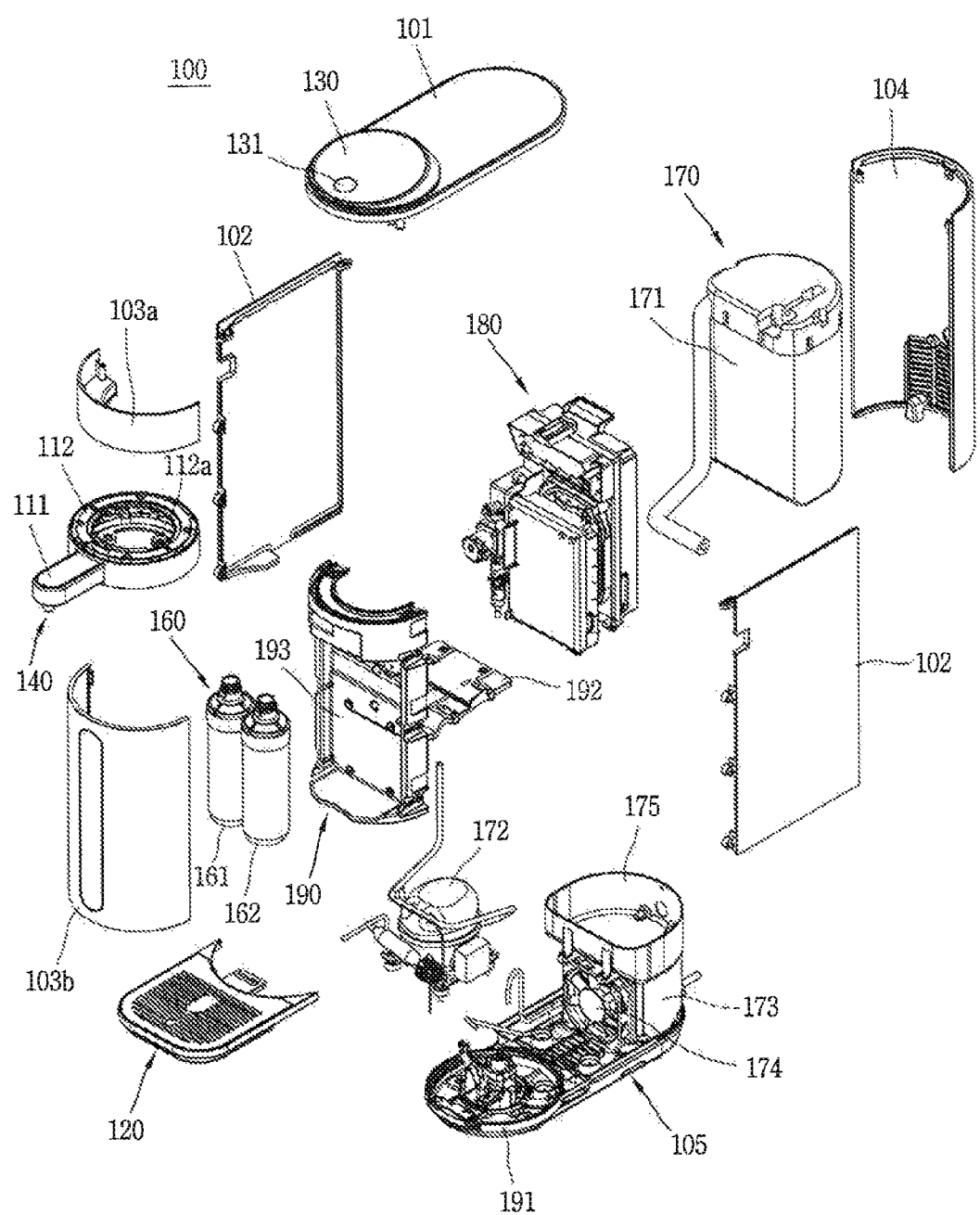

FIG. 2 illustrates an example water purifier.

The water purifier may include a filter unit 160, a cooling device 170 and a heating device 180.

The filter unit 160 is disposed within a front cover 103. The filter unit 160 may be disposed at a filter bracket assembly 190.

The filter bracket assembly 190 may be vertically disposed at a rear side of the front cover 103 so as to face the front cover 103. The filter unit 160 may include a plurality of filters 161 and 162 that may be detachably mounted at a filter mounting region 193 formed at a front side of the filter bracket assembly 190.

The filter unit 160 may be configured to purify water, e.g., raw water, by filtering raw water through a membrane.

The filter unit 160 may include a plurality of unit filters 161 and 162. For instance, the unit filters 161 and 162 may include a pre-filter 161 such as a carbon block, adsorption filters 161 and 162 and the like, and a high performance filter 162 such as a HEPA filter, a UF filter and the like.

In some implementations, as illustrated in FIG. 2, the filter unit 160 includes two unit filters 161 and 162. In some other implementations, the filter unit 160 can include more than two filters.

The plurality of unit filters 161 and 162 may be coupled to each other in a preset order. For instance, the pre-filter 161 that removes large sized particles from raw water may be disposed at an upstream of the high performance filter 162, and an outflow port of the pre-filter 161 may be coupled to an inflow port of the high performance filter 162. The raw water that has passed through the pre-filter 161 may be filtrated by the HEPA filter or the UF filter. According to this, as water that does not have large-sized particles is supplied to the high performance filter 162 after removing the large-sized particles, the high performance filter 162 can be protected.

Purified water produced by the filter unit 160 may be supplied to a user through the water discharge port 111, or supplied to a user as cold water or hot water after being cooled or heated by the cooling device 170 or the heating device 180.

The water discharge port 111 may be rotatably disposed at an upper end of the bracket assembly 190.

The water discharge port 111 may be supported to be rotatable by a circular shaped rotation part 112.

A guide protrusion having a predetermined curvature may be formed at an upper or lower portion of the rotation part 112, and a guide rail having a predetermined curvature may be formed at an upper portion of the filter bracket assembly 190. The guide protrusion and the guide rail may be coupled so as to be meshed with each other, and may support the water discharge port 111 so as to be rotated at a predetermined range of angle.

The front cover 103 may include a lower cover 103a coupled to the filter bracket assembly 190 to cover a front side of the filter unit 160 and an upper cover 103b coupled to the filter bracket assembly 190 to cover a space between the rotation part 112 and the operation panel 130.

The water discharge port 111 may be protruded over the front cover 103 through an opening formed between the lower cover 103a and the upper cover 103b of the front cover 103. The rotation part 112 may be inserted and disposed within the front cover 103.

Purified water purified by the filter unit 160 may be cooled by the cooling device 170.

The cooling device 170 may be implemented by a refrigeration cycle device.

The refrigeration cycle device may produce cold water by cooling purified water provided from the filter unit 160.

The refrigeration cycle device may include a compressor 172, a condenser 173, an expander and an evaporator. A refrigerant piping may connect the compressor 172, the condenser 173, the expander, and the evaporator. A phase change of refrigerant may occur through a compression process, a condensing process, an expansion process, and an evaporation process while refrigerant circulates the refrigeration cycle device. In particular, water may be cooled by absorbing heat from the cooling water in the process of evaporating refrigerant from the evaporator.

Cooling water for the base cover 105 may be distinguished from cold water to be drunk by a user. The cooling water represents water that used to cool water, i.e., to make cold water.

Cooling water may be stored within the cooling water tank assembly 171 provided within the main body 100.

The evaporator may be installed within the cooling water tank assembly 171 in the type of coil. The evaporator may be embodied as a refrigeration pipe in the type of coil. The expander may be configured as a capillary tube to expand refrigerant at a low temperature and a low pressure. The evaporator may be configured such that refrigerant may flow therein and cool cold water by absorbing heat from cooling water through a heat exchange between refrigerant and cooling water.

A cooling coil may be disposed within the cooling water tank assembly 171 in the type of coil. The cooling coil may be coupled to the filter unit 160 to provide a flow path that cools purified water provided from the filter unit 160.

The cooling coil may be installed within the cooling water tank assembly 171 so as to be immersed in cooling water. The cooling coil may be formed of a metallic material so as to heat exchange with cooling water.

Purified water purified by the filter unit 160 may be cooled by cooling water while flowing through the cooling coil disposed within the cooling water tank assembly 171, thereby producing cold water.

A rotation guide member 191 to rotatably support a residual water tray 120 may be installed at a front side of the base cover 105.

The residue water tray 120 may include a protrusion at its rear part. A rotation guide protrusion having a predetermined curvature may be formed at a front part of the base cover 105. The rotation guide member 191 may be coupled to the rotation guide protrusion in the type of ring so as to enclose the rotation guide protrusion. A mounting part may be formed at one side of the rotation guide, and the mounting part may be formed in a rectangular shape corresponding to the protrusion part. As the protrusion part may be inserted and mounted to the mounting part, the residual water tray 120 may be rotated with the rotation guide member 191 with respect to the base cover 105.

A condenser 173 may be installed at a rear side of the base cover 105. The condenser 173 may condense refrigerant by heat-exchanging air introduced from the exterior and refrigerant. External air may be introduced into the water purifier through an intake port formed at a bottom surface of the base caver 105. A fan 174 may be installed at a front side of the condenser 173. The fan 174 may be configured to supply air to the condenser 173. External air may refrigerate refrigerant within the condenser 173 by absorbing heat from the condenser 173. A heat exchange duct may be provided within the main body 100 to enhance the radiation efficiency, and external air may be introduced and discharged through the heat exchange duct.

A support 175 that supports the cooling water tank assembly 171 may be provided at an upper part of the condenser 173. The support 175 may include a drainage hole to replace cooling water within the cooling water tank assembly 171.

Hot water may be produced by heating purified water purified by the filter unit 160 by a heating device 180.

The heating device 180 may be disposed between a filter bracket assembly 190 and the cooling water tank assembly 171.

A support member 192 may be formed to protrude at a rear side of the main body 100 in an opposite direction of a filter mounting region 193. The support member 192 may support an induction heating module and a control module.

Figure 3:
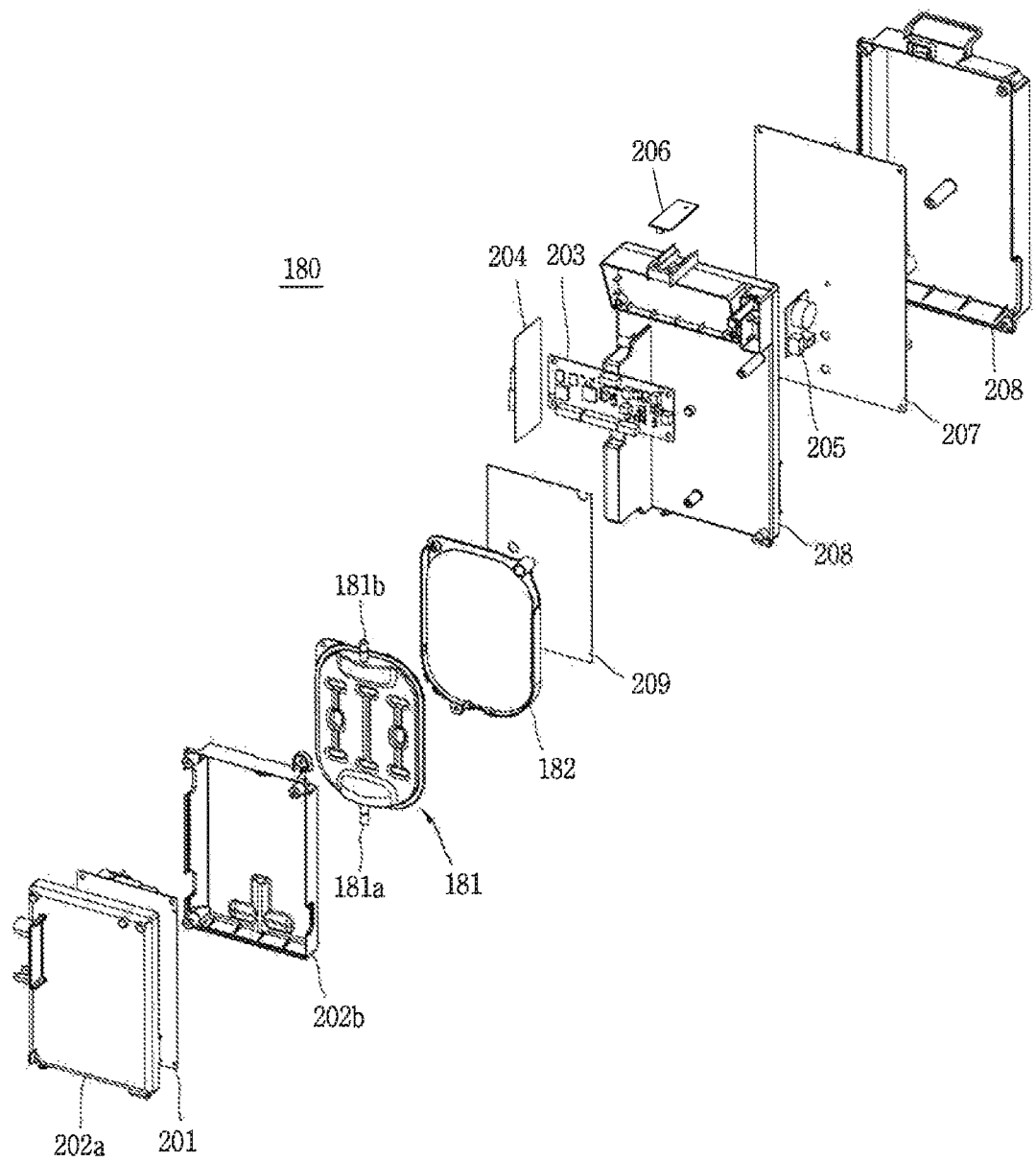
FIG. 3 is a diagram illustrating an example induction heating module and an example control module of FIG. 2.
Figure 4:
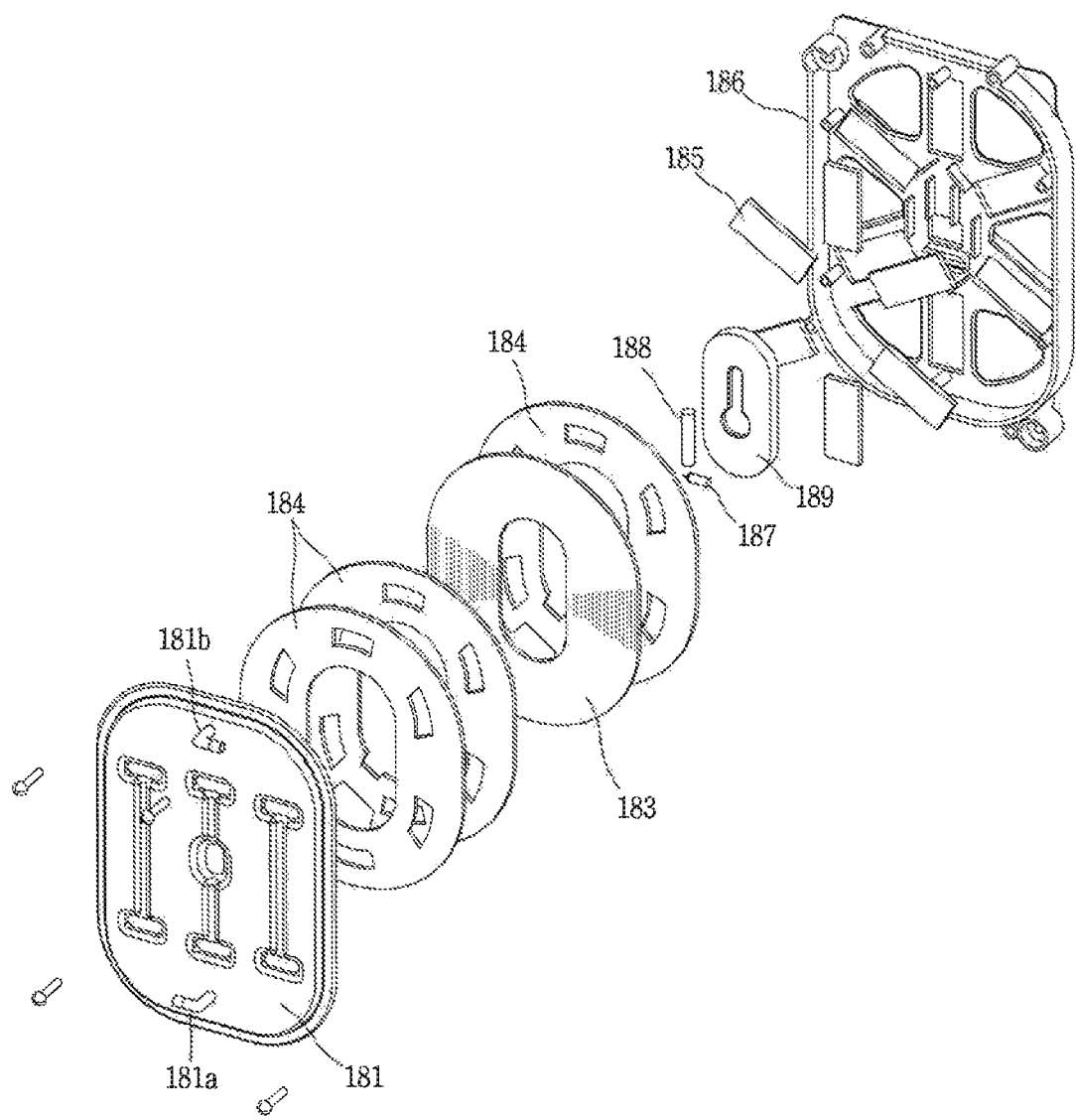
FIG. 4 is a diagram illustrating the example induction heating module of FIG. 3.

FIG. 3 illustrates an example induction heating module and an example control module of FIG. 2. FIG. 4 illustrates the example induction heating module of FIG. 3.

The induction heating module may include a hot water tank assembly 181 and an induction heater 182.

Further, the induction heating module may include an induction heating printed circuit board 201, an induction heating printed circuit board cover 202 and a shield plate 209. The control module may include a control printed circuit board 203, a noise printed circuit board 204, a NFC (Near Field Communication) printed circuit board, a buzzer 205, a main printed circuit board 207 and a main printed circuit board cover 208.

The hot water tank assembly 181 may include an inner space to heat purified water provided from the filter unit 160. The hot water tank assembly 181 may be configured to generate heat by being influenced by lines of magnetic force formed by the induction heater 182.

The hot water tank assembly 181 may be configured such that an internal space is provided, through which purified water may flow, and formed by two plates disposed to face and welded with each other so as to keep air tight therein.

An inflow port 181a may be formed at a lower part of the hot water tank assembly 181. Purified water may be introduced into the hot water tank assembly 181 through the inflow port 181a.

Purified water may be instantly heated while passing through the internal space of the hot water tank assembly 181 so as to produce hot water.

An outflow port 191b may be formed at an upper part of the hot water tank assembly 181. Hot water heated at the hot water tank assembly 181 may be discharged through the outflow port 191b.

A length and a width as well as a thickness of the hot water tank assembly 181 may be reduced compared to the conventional one so that minimization of the water purifier can be embodied.

The induction heater 182 may heat the hot water tank assembly 181 by an induction heating.

The induction heater 182 may use an induced current generated by a magnetic field as a heat source. The induction heater 182 may include a working coil 183, a ferrite 185, a bracket 186, a temperature fuse 187, and a temperature sensor 188 which may be disposed nearly at a rear side of the hot water tank assembly 181.

The working coil 183 may be wound up in an oval shape in plural times to form an oval hole therein.

When an AC current is applied to the working coil, an AC magnetic field that changes its direction according to the time may be formed. In this instance, an eddy current may be generated at the hot water tank assembly 181 by an electromagnetic induction phenomenon. As a Joule heat is generated at the hot water tank assembly 181 by the eddy current, the hot water tank assembly 181 may be heated.

A spacer 184 (an alias, mica sheet) may be disposed between the hot water tank assembly 181 and the working coil to uniformly maintain a gap therebetween.

The spacer 184 may be formed to have a thin thickness in the form of oval sheet.

The spacer 184 may be formed of an insulator that prevents an electric conduction and has heat-resistance properties.

The spacer 184 may be disposed between the hot water tank assembly 181 and the working coil 183 in plural numbers to cutoff conduction of heat generated from the hot water tank assembly 181 to the working coil 183. The spacer 184 may be disposed between the working coil 183 and the ferrite 185 to cutoff conduction of heat generated from the working coil 183 to the ferrite 185. Further, the spacer 184 may insulate conduction of current of the working coil 183 to the ferrite 185.

The ferrite 185 may be radially disposed in plural numbers, and configured to cutoff electromagnetic wave generated from the working coil 183.

A bracket 186 may be coupled to a rear surface of the hot water tank assembly 181 by a coupling member such as a screw, and configured to support and accommodate therein the working coil 183, the spacer 184 and the ferrite 185.

A fixture member 189 in an oval shape may be mounted at a center of the bracket 186. The fixture member 189 may be formed of a heat-resistance material such as silicon. The fixture member 189 may be fixed to a rear surface of the hot water tank assembly 181 through a through-hole formed at a center of the plural working coils 183 and the spacer 184. The fixture member 189 may prevent the working coil 183 and the spacer 184 from moving to the left and right.

A temperature sensor 222 and a temperature fuse 187 may be mounted within the fixture member 189.

The temperature sensor 222 may be mounted to a rear surface of the hot water tank assembly 181 to sense heat conducted from the hot water tank assembly 181 and measures a temperature of the hot water tank assembly 181 as the electric resistance value changes according to the sensed temperature of heat.

The temperature fuse 187 may be configured to cutoff an electric current applied to the working coil 183 by being disconnected when the temperature of the hot water tank assembly 181 is higher than a preset temperature value.

An induction heating module is configured to be supplied with purified water produced by the filter unit 160. Especially, in case of a direct water type water purifier that does not include a separate water tank, the induction heating module may directly be provided with purified water from the filter unit 160.

An induction heating printed circuit board 201 may control an induction heating operation of the induction heater 182. For instance, when a user presses a water discharge button 131 of the operation panel 130 to discharge hot water, purified water produced at the filter unit 160 may be supplied to the hot water tank assembly 181.

The induction heating printed circuit board 201 may control an electric current to flow through the working coil 183.

The induction heating printed circuit board 201 may control a discharge temperature of hot water by controlling a frequency of the electric current flowing through the working coil 183.

For instance, when a DC current flows in the working coil 183, the direction of magnetic is changed as much as frequencies of the DC current. When a Dc current of 60 Hz is applied, the direction of magnetic field is changed 60 times for one second, while when a Dc current of 400 kHz is applied, the direction of magnetic field is changed 400,000 times for one second. When the hot water tank assembly 181 that is an object to be heated is placed within the magnetic field that changes as above, a voltage is induced to the hot water tank assembly 181 by the Faraday's law, thereby generating an electron flow at the hot water tank assembly 181. The electric current induced at the hot water tank assembly 181 flows in an opposite direction to current flowing in the working coil 193. Thus, it is possible to control the frequency of the current that flows in the hot water tank assembly 181 by controlling the frequency of the current that is applied to the working coil 183. The hot water tank assembly 181 may generate heat by the current supplied to the working coil 183. Purified water may be converted into hot water while passing through the hot water tank assembly 181.

The induction heating printed circuit board cover 202 may be configured to enclose the induction heating printed circuit board 201. The induction heating printed circuit board cover 202 may include a first induction heating cover 202a and a second induction heating cover 202b.

The first induction heating cover 202a and the second induction heating cover 202b may be coupled with each other at their edges. The induction heating printed circuit board 201 may be mounted within an internal space formed by the first induction heating cover 202a and the second induction heating cover 202b. The first induction heating cover 202a and the second induction heating cover 202b may prevent water from being infiltrated. Further, the first induction heating cover 202a and the second induction heating cover 202b may be formed of a flame retardant material to protect the induction heating printed circuit board 201 from damage by fire.

A shield plate 209 may be disposed at one side of the induction heater 182. The shield plate 209 may be disposed at an opposite side of the hot water tank assembly 181 based on the induction heater 182. The shield plate 209 may be configured to prevent lines of magnetic force generated by the working coil 183 from radiating to remaining regions except the hot water tank assembly 181. The shield plate 209 may be formed of an aluminum or other material that can change lines of magnetic force.

A control printed circuit board 203 is a sub-structural element of a display printed circuit board. The control printed circuit board 203 is not an essential structural element to drive a water dispenser such as a water purifier, but may function as a sub-structural element for a subsidiary function of the display printed circuit board.

A noise printed circuit board 204 is an element to supply a power to the induction heating printed circuit board 201. As the output voltage for induction heating is very high, a sufficient power should be supplied. The noise printed circuit board 204 is not an essential structural element to drive a water dispenser such as a water purifier. However, the water dispenser such as a water purifier may have the noise printed circuit board 204 to prepare for a case that a power needed for an induction heating is not sufficiently supplied. It is possible to satisfy an output voltage for induction heating by supplying a separate power to the induction heating printed circuit board 201. The noise printed circuit board 204 may function to supply a subsidiary power to other elements in addition to the induction heating printed circuit board 201.

A buzzer 205 may be a module that is configured to provide correct malfunction information to a user by outputting a sound when a malfunction occurs at a water dispenser like a water purifier. The buzzer 205 may output a specific sound of preset code according to the kind of malfunctions.

An NFC printed circuit board 206 is an element to send and receive data with communication equipments. These days, a personal communication equipment such as a smart phone is popular. Thus, if a consumer can check the state of the water dispenser or input a control signal using a personal communication equipment, it is possible to enhance convenience to a consumer. The NFC printed circuit board 206 may provide state information of a water dispenser to a personal communication equipment that is paired therewith and receive a user's control command from the personal communication equipment.

A main printed circuit board 207 may control a general operation of the water dispenser such as a water purifier. The operations of the operation panel 130 as shown in FIG. 1, or of the compressor 172 as shown in FIG. 2 may be controlled by the main printed circuit board 207. The main printed circuit board 207 may be supplied with a power from the noise printed circuit board 204, when the power is insufficient.

A main printed circuit board cover 208 may be formed to enclose the main printed circuit board 207. The main printed circuit board cover 208 may include a first main cover 208*a* and a second main cover 208*b*.

The first main cover 208*a* and the second main cover 208*b* may be coupled to each other with their edges. The main printed circuit board 208 may be installed within an internal space formed by the first and second main covers 208*a* and 208*b*. The first and second main covers 208*a* and 208*b* may prevent infiltration of water. Further, the first and second main covers 208*a* and 208*b* may be formed of a flame retardant material to protect the main printed circuit board 207 from damage by fire.

Figure 5:
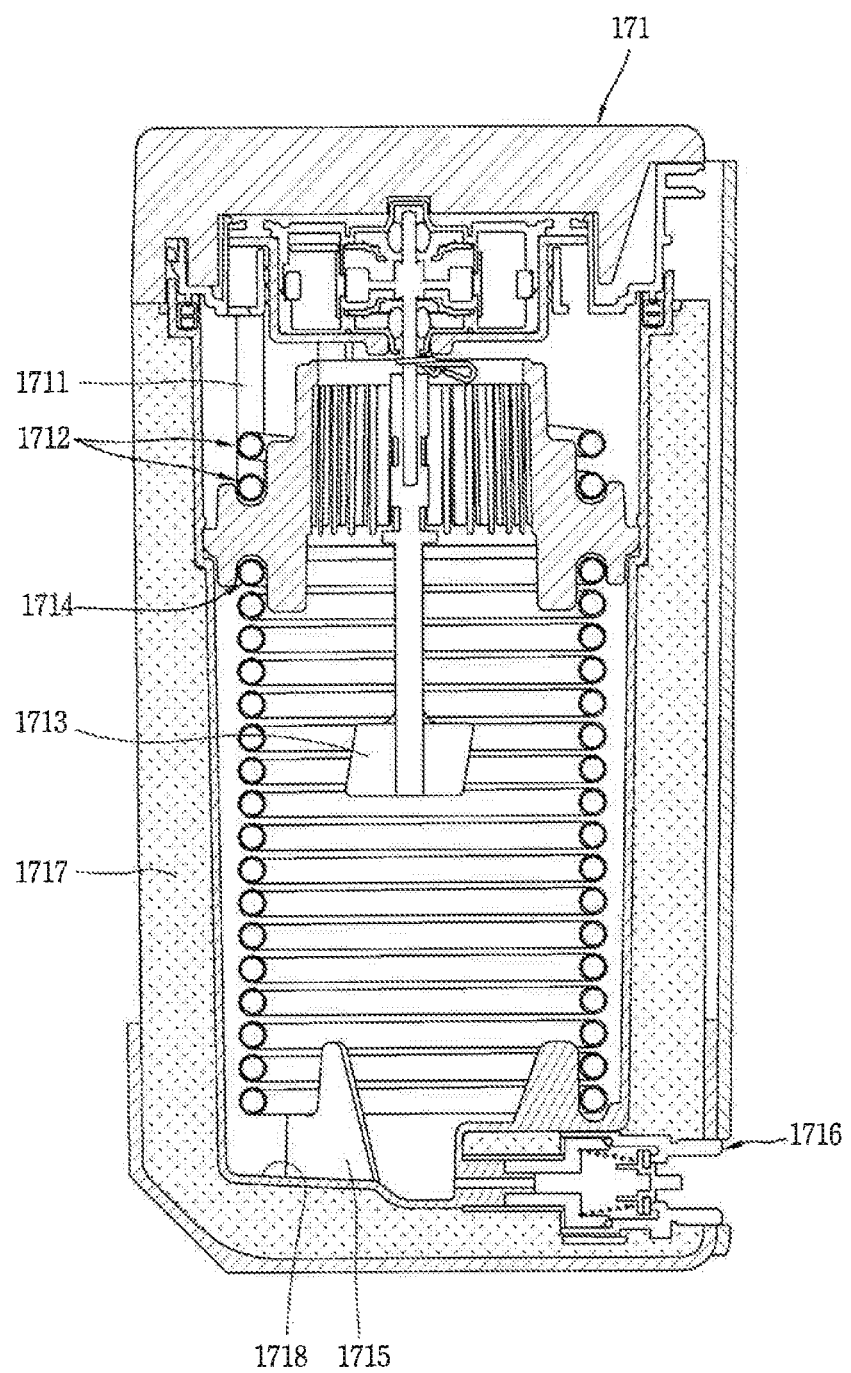
FIG. 5 is a diagram illustrating an example cooling water tank assembly of FIG. 2.

FIG. 5 illustrates an example cooling water tank assembly of FIG. 2.

An evaporator 1712 may be installed within a cooling water tank assembly 171. A thermistor 1711 that measures a temperature of cooling water may be installed within a cooling water tank assembly 171. The thermistor 1711 may be configured to measure a temperature of an object to be measured using its properties that a resistance value is changed depending on temperatures. The thermistor 1711 may measure the temperature of cooling water. The temperature of cooling water measured by the thermistor 1711 may be a basis for determining an operation of refrigeration cycle.

When the temperature of cooling water measured by the thermistor 1711 is higher than a first reference temperature, a refrigeration cycle of a water purifier may be operated to lower the temperature of cooling water. Then the compressor and the condenser may be operated to compress and condense refrigerant, and an expansion of refrigerant may be carried out at the expansion device. The expanded refrigerant may pass through an evaporator 1712 installed within the cooling water tank assembly 171. The cooling water stored in the cooling water tank assembly 171 heat-exchanges with refrigerant passing through the evaporator 1712 so as to be cooled.

An agitator 1713 may be installed within the cooling water tank assembly 171. The agitator 1713 may be immersed in the cooling water and configured to rotate based on a shaft. The agitator 1713 is an element that facilitates a heat-exchange between fluids within the cooling water tank assembly 171. The agitator 1713 may facilitate heat-exchange between refrigerant and cooling water, and cooling water and purified water.

The thermistor 1711 may continuously measure the temperature of cooling water. When the temperature of cooling water measured by the thermistor 1711 is lower than a second reference temperature, operation of the refrigeration cycle of the water purifier is stopped. The second reference temperature is lower than the first reference temperature. The first and second reference temperatures may set a reference for the operation and stop of the refrigeration cycle, respectively. The temperature of the cooling water stored in the cooling water tank assembly 171 may be maintained between the first and second reference temperatures by the measurement of temperature by the thermistor 1711 and the operation of refrigeration cycle.

A cooling coil 1714 may correspond to a flow path through which purified water flows. All the flow paths from a cross section of a flow path indicated in FIG. 5 as reference number 1203 to the flow path at the bottom surface 1718 may correspond to the cooling coil 1714. The cooling coil 1714 may be installed within the cooling water tank assembly 171 and immersed in cooling water. Purified water passing through the cooling coil 1714 may heat-exchange with cooling water. Heat may be transmitted from the purified water to the cooling water, and the purified water may be converted into cold water by heat-exchanging with the cooling water within a short time.

The agitator 1713 may be rotated based on a shaft to facilitate a heat-exchange of purified water with cooling water. A support unit 1715 may be configured to support the cooling coil 1714. The support unit 1715 may be protruded from an internal bottom surface 1718 of the cooling water tank assembly 171 toward the cooling coil 1714. The support unit 1715 may include a recess having a size corresponding to an outer circumference of the cooling coil 1714. The cooling coil 1714 may be installed on the recess of the support unit 1715 and supported by the support unit 1715.

As described above, cooling water stored in the cooling water tank assembly 171 should be periodically replaced for sanitation. Drainage of cooling water may be carried out through a cooling water discharge valve 1716 that forms a drainage flow path.

The cooling water drainage valve 1716 may be coupled to the cooling water tank assembly 171. The cooling water drainage valve 1716 may be protruded from the cooling water tank assembly 171 so as to form a discharge flow path of cooling water stored in the cooling water tank assembly 171.

A coupling structure for the cooling water tank assembly 171 and the cooling water drainage valve 1716 may be variously changed.

The water purifier may include a foam insulation member 1717 to insulate the cooling water tank assembly 171. The foam insulation member 1717 may enclose an outer circumference of the cooling water tank assembly 171. The reason why the foam insulation member 1717 insulates the cooling water tank assembly 171 is to keep the cooling water tank assembly 171 cool. As time passes, the temperature of the cooling water stored in the cooling water tank assembly 171 may gradually get nearer to a normal temperature. The foam insulation member 1717 may restrain heat from the cooling water from transmitting to the air so as to lower the speed for the temperature of cooling water to get nearer to a normal temperature.

The foam insulation member 1717 may enclose the cooling water drainage valve 1716 to prevent formation of dew on the cooling water drainage valve 1716. The reason why the foam insulation member 1717 encloses the cooling water drainage valve 1716 is to cutoff the cooling water drainage valve 1716 from contacting the air. As dew is formed by condensing vapor in the air, it is possible to prevent formation of dew by cutting off contacting air. The foam insulation member 1717 may prevent formation of dew on an outer circumference of the cooling water drainage valve 1716 by cutting off the cooling water drainage valve 1716 from contacting the air.

Figure 6:
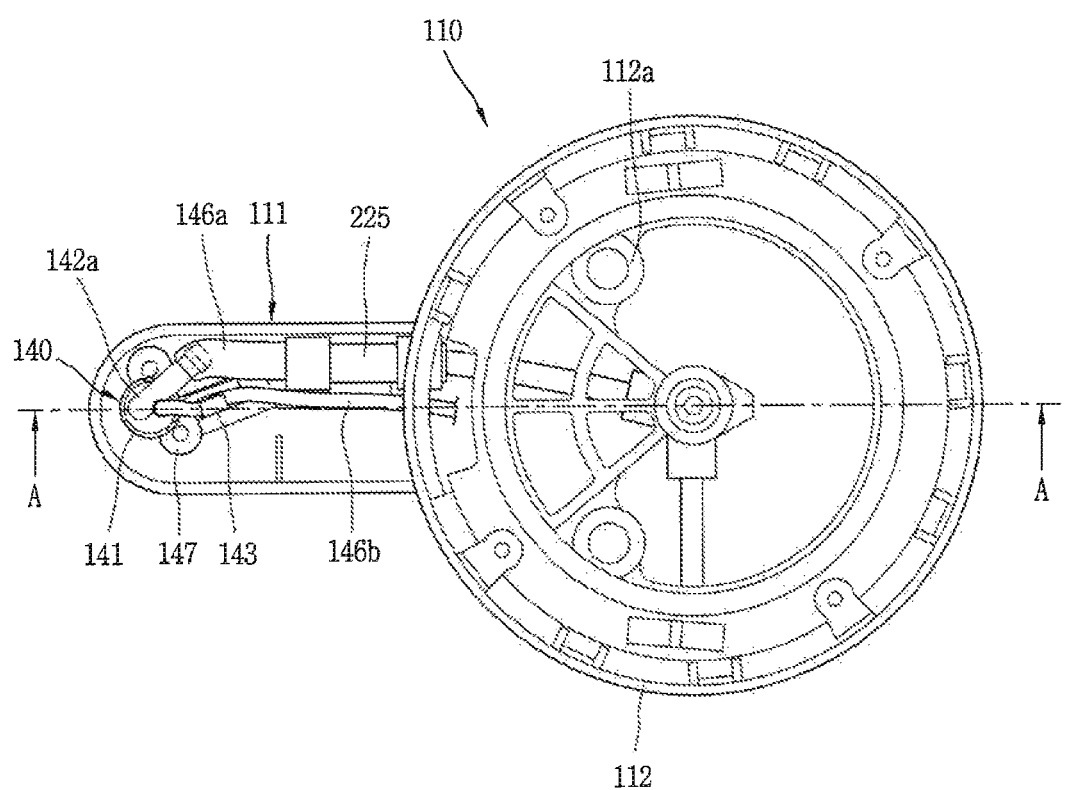
FIGS. 6 and 7 are diagrams illustrating an example water discharge unit assembly of FIG. 2.
Figure 7:
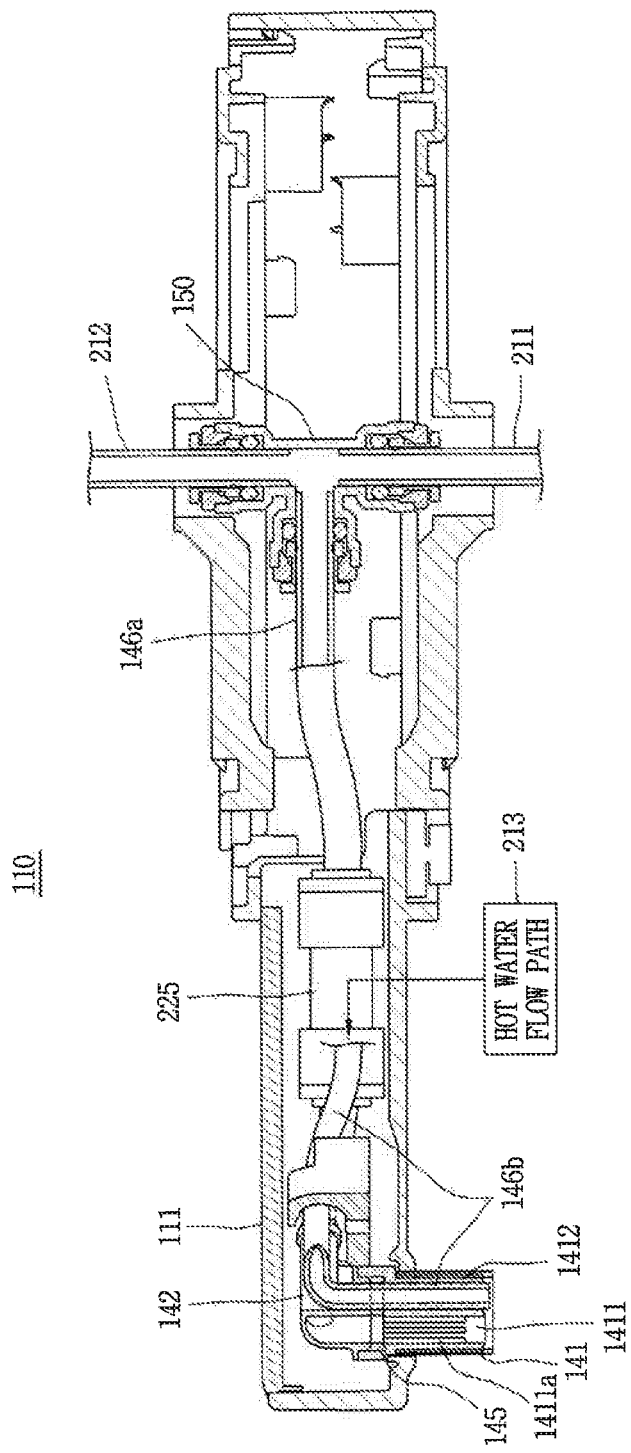
Figure 8:
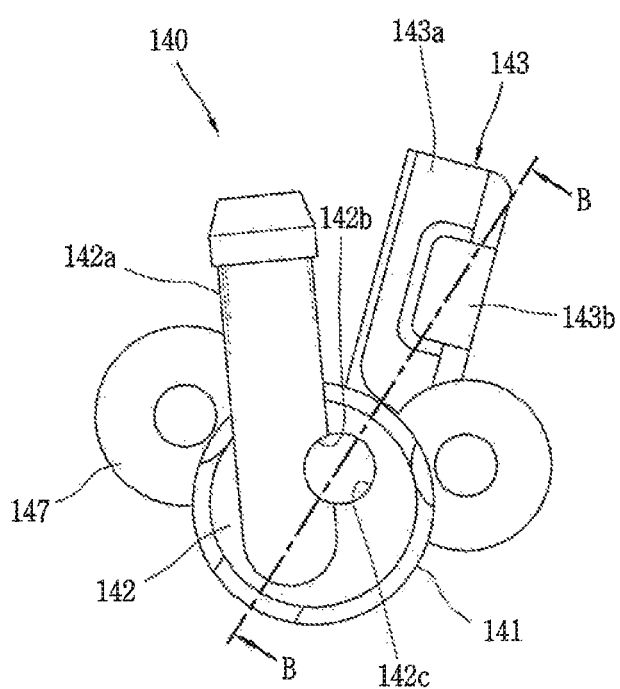
FIGS. 8 to 10 are diagrams illustrating an example water discharge faucet of FIG. 6.
Figure 9:
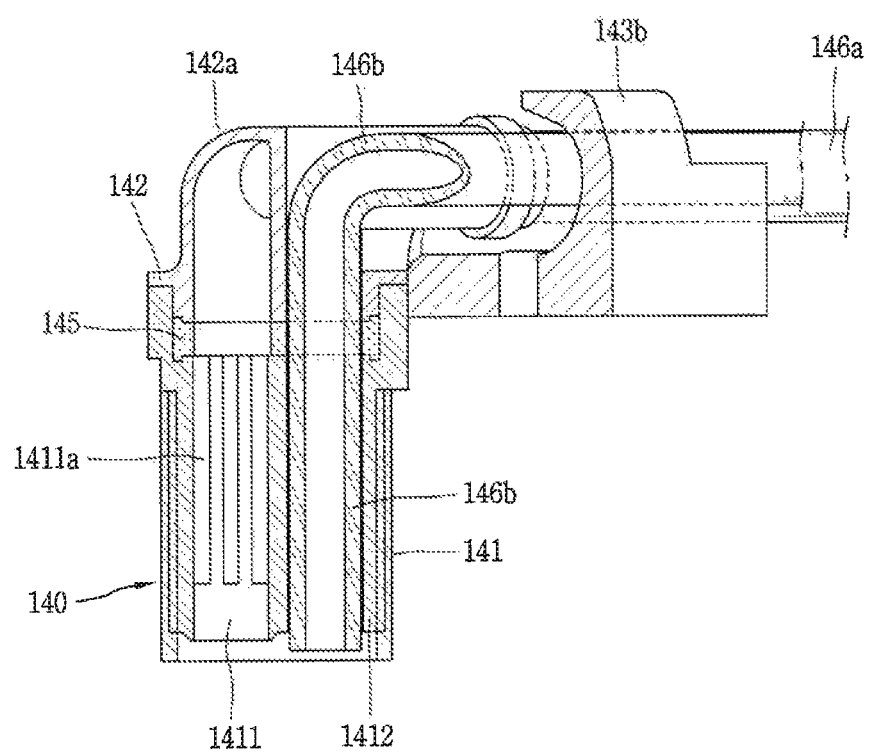
Figure 10:
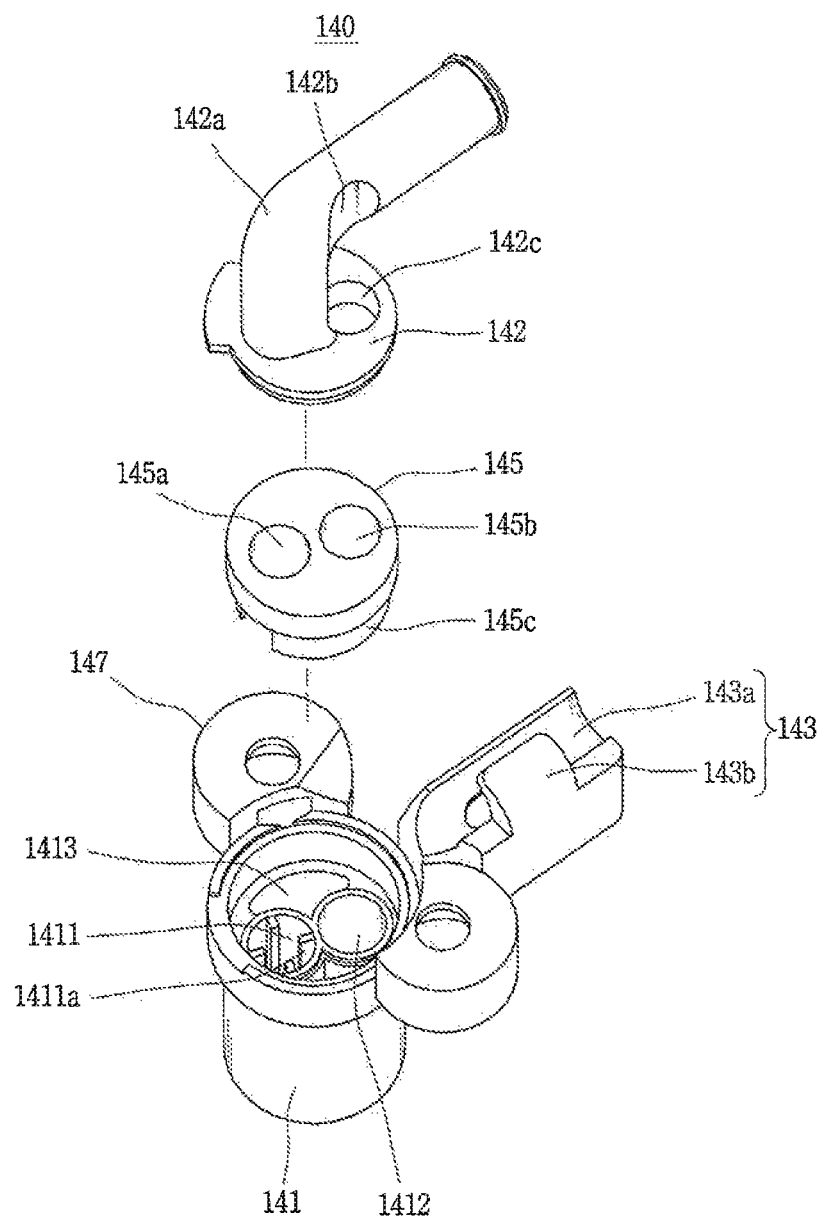

FIGS. 6 and 7 illustrate an example water discharge unit assembly 110. FIGS. 8 to 10 illustrate an example water discharge faucet 140 of FIG. 6.

The water discharge unit assembly 110 may include a rotation part 112 and a water discharge unit 111 extended from the rotation part 112 in one direction.

The rotation part 112 may be rotatably installed within the main body 100 so as to rotate the water discharge unit 111 at a range of a predetermined angle. The water discharge unit 111 may be rotatable by the rotation part 112 in a state that it is exposed to the outside of the main body 100.

The rotation part 112 may be rotatable within a range of a predetermined angle along a guide rail formed at an upper end of a filter bracket assembly 190 with a certain curvature.

The rotation part 112 may include a plurality of coupling rings 112a for coupling with the operation panel 130. Coupling protrusions of the operation panel 130 may be inserted into and coupled to the coupling rings 112a of the rotation part 112. By such a configuration, when the water discharge port 111 is rotated, the rotation part 112 coupled to the water discharge port 111 is rotated and the operation panel 130 coupled to the rotation part 112 through the coupling rings 112a may be rotated.

In this instance, one housing may be formed to enclose external surfaces and extended along the water discharge port 111 and an external circumference of the rotation part 112 so that the water discharge port 111 and the rotation part 112 may be formed integrally into one body.

To supply drinking water to a user, one water discharge faucet 140 may be provided at one end, e.g., a front end, of the water discharge port 111. The water discharge faucet 140 may be downwardly protruded from a bottom surface of the water discharge port 111.

The water discharge faucet 140 may be formed in a cylindrical shaped faucet body 141. The water discharge faucet 140 may be disposed at a center line in a lengthwise direction of the water discharge port 111. In some implementations, the water discharge port 111 includes one port. In some other implementations, the water discharge port 111 includes multiple ports so that two or more flow paths may be independently coupled to the water discharge faucet 140.

In this example, the two flow paths may include a first hose 146a through which purified water flows and a second hose 146b through which hot water flows. In some implementations, the first hose 146a is a cold purified water discharge flow path through which cold purified water passes.

The first hose 146a and the second hose 146b may be provided within the water discharge port 111. The first hose 146a may be coupled to the purified water flow path 211. The first hose 146a may be coupled to the purified water flow path 211 and the cold water flow path 210. A cooling water tank assembly 171 that is a cooling device 170 may be installed to the cold water flow path 212. The cold water flow path 212 may be divided from the purified water flow path 211 and rejoined together. The first hose 146a may be a flow path where the purified water flow path 211 and the cold water flow path 212 are joined together.

Referring to FIG. 7, a coupling part 150 may be provided to incorporate the purified water flow path 211 and the cold water flow path 212. For example, a T-shaped (3-directions) connection pipe 150 may be disposed at a joining portion of the purified water flow path 211 and the cold water flow path 212. The cold water flow path 212 may be extended in a vertical downward direction at an upper part of the rotation part 112 and coupled to a second inlet of the T-shaped connection pipe 150. The cold water flow path 212 and the purified water flow path 211 may be joined by being connected with the T-shaped connection pipe 150, and cold water or purified water may flow through the first hose 146a that forms a cold and purified water flow path.

The second hose 146b may be coupled to a hot water flow path 213. The hot water flow path 213 may be formed by dividing from the purified water flow path 211. A hot water tank assembly 181 and an induction heater 182 which form a heating device 180 may be disposed at the hot water flow path 213. Purified water flowing in the hot water flow path 213 may be heated by the hot water tank assembly 181 and produced as hot water. Hot water may flow in the second hose 146b.

The first hose 146a and the second hose 146b may be coupled to one purified water flow path 211. However, the first hose 146a and the second hose 146b are separate hoses which may be separated from one another.

The second hose 146b may be coupled to an outflow port 181b of the hot water tank assembly 181. The second hose 146b may be formed to have a radius smaller than that of the first hose 146a. The quantity of flow of the hot water tank assembly 181 may be smaller than that of the cold water flow path 212. The tube diameter of the first hose 146a may be ¼ inch. However, the tube diameter of the second hose 146b may be less than 3/16 inch. The reason why the tube diameter of the second hose 146b is reduced is to reduce the amount of water remaining in the hot water flow path 213 so that influence by residual water remaining within the hot water flow path 213 may be minimized.

The water discharge faucet 140 may be formed such that purified water or cold water flowing from the first hose 146a and cold water flowing from the second hose 146b may be discharged in a separate water stream.

To this end, the water discharge faucet 140 may include a first faucet part 1411 and a second faucet part 1412 within a single faucet body 141.

The single faucet body 141 may be formed in a cylindrical shape.

The first faucet part 1411 and the second faucet part 1412 may be formed to have separate water discharge ports within the single faucet body 141. The first faucet part 1411 may be provided to discharge purified or cold water. The second faucet part 1412 may be provided to discharge hot water.

The first faucet part 1411 may be coupled to communicate with the first hose 146a and include a water discharge hole within thereof.

The second faucet part 1412 may include an insertion hole 142c separately from the water discharge hole of the first faucet part 1411.

The first and second faucet parts 1411 and 1412 may be provided in parallel in a circular shape, respectively. The first and second faucet parts 1411 and 1412 may circumscribed with each other at their external circumferences. The first and the second faucet parts 1411 and 1412 may be respectively inscribed with an internal circumferential surface of the faucet body 141. Viewing an internal section of the faucet body 141 from an upper part of the faucet body 141 in the direction of gravity, a relatively large circle (the faucet body 141) may be drawn, and two circles (the first faucet part 1411 and the second faucet part 1412) may be circumscribed with each other and inscribed with a large circle as well.

In some implementations, the first faucet part 1411 and the second faucet part 1412 are disposed at a front and a rear side based on a center line in a lengthwise direction, viewing the water discharge port 111 in FIG. 6 such that when a user places a cup at a center of the lower part of the water discharge faucet 140, purified water, cold water or hot water may be discharged in a direct downward direction at a center of the water discharge port 111 based on a center line in a lengthwise direction.

When the first and second faucet parts 1411 and 1412 are disposed in left and right directions, a user may need to place a cup one-sided from a center line in a lengthwise direction of the water discharge port 111 to drink cold water or hot water, but a user may mistakenly place a cup one-sided from a center line in a lengthwise direction of the water discharge port 111, but at the right lower side of a center line of the water discharge faucet 140 or in an opposite direction. In this instance, water may not be discharged into a cup, but flow out of a cup. This may result in getting a user's hand or fingers scalded by hot water.

To prevent such a danger in advance, the first faucet part 1411 may be disposed at a front side and the second faucet part 1412 may be disposed at a rear side of the first faucet part 1411, based on a center line in a lengthwise direction of the water discharge port 111.

Further, the second hose 146b may be inserted and coupled to the second faucet part 1412 so as to protrude right downwardly, e.g., about 1 mm to 2 mm, from a bottom surface of the first faucet part 1411. The length of protrusion of the second hose 146b can be changed.

When an end of the second hose 146b is inserted similarly to the height of a bottom surface of the first faucet part 1411, since the tube diameter is smaller than that of the first faucet part 1411, hot water discharged from the second hose 146b may be spread to other portions than a portion of the hole of the second hose 146b at a bottom surface of the second faucet part 1412, causing scald to a user.

A plurality of hollow parts 1413 may be provided between an internal circumference of the faucet body 141 and external surfaces of the first and second faucet parts 1411 and 1412.

In this example, the first faucet part 1411 and the hollow part 1413, and the second faucet part 1412 and the hollow part 1413 may be separately divided and alternatively disposed in a circumferential direction.

Further, the water discharge faucet 140 may include an upper cover that covers an upper part of the faucet body 141.

The upper cover 142 may be coupled to an upper end of the faucet body 141. The faucet body 142 may be welded to the faucet body 141. The upper cover 142 may include a connection tube 142a to be coupled to the first hose 146a. The coupling tube 142a may be formed to be bent at a right angle on an upper surface of the upper cover 142 with a rounded corner. The coupling tube 142a may be coupled to an end of the first hose 146a to connect the first tube 146a to the water discharge hole of the first faucet part 1411 so as to communicate with each other.

The upper cover 142 may include an insertion hole 142c through which the second hose 146c is inserted. The insertion hole 142c may be formed to have a diameter corresponding to an external surface of the second hose 146b.

When a user or a worker to repair or maintain the water purifier connects an external pipe to the water purifier and discharges water through the water discharge faucet 140, the pressure within the pipe at a lower stream of the water discharge faucet 140 may be instantly lowered, while discharging water from the water discharge faucet 140. In this instance, as the pressure within the pipe is reduced, a backflow to the water discharge faucet 140 within the pipe may occur. In some implementations, to prevent a backflow of water to the water discharge faucet 140, a packing 145 may be provided within the faucet body 141. The packing 145 may be disposed between an upper surface of the first faucet part 1411 and second faucet part 1412 and a lower surface of the upper cover 142 so as to cover the hollow part 1413. A lower surface of the packing 145 may contact upper surfaces of the first and second faucet parts 1411 and 1412 and an upper surface of the packing 145 may contact a lower surface of the upper cover 142.

The packing 145 may be formed of a silicon material and include an insertion protrusion 145c to prevent a backflow of water through the hollow part 1413. The insertion protrusion 145c may be protruded toward the hollow part 1413 so as to cover the hollow part 1413, and may be formed to have a shape and a size that correspond to a sectional shape of the hollow part 1413.

The packing 145 may include a first through hole 145a and a second through hole 145b.

The first through hole 145a may be formed to connect the water discharge hole of the first faucet part 1411 to the connection tube 142a of the upper cover 142 so as to be communicated with each other. The second through hole 145b may be configured to connect the insertion hole 142c of the upper cover 142 to the second faucet part 1412 such that the second hose 146c may be inserted therethrough.

The packing 145 may be pressure-inserted and tight-coupled onto an upper surface of the first and second faucet parts 1411 and 1412 as the upper cover 142 is welded to an upper side of the faucet body 141.

Since a connection portion of the connection tube 142a coupled to the upper cover 142 and the insertion hole 142c into which the second hose 146c is inserted are placed on the front and rear sides on a center line of the water discharge port 111 in a lengthwise direction, the connection tube 142a may be formed to be sided in one direction, e.g., horizontally, from a center line in a lengthwise direction, viewed from a plane of FIG. 6, to avoid interference with the second hose 146b.

In some implementations, to prevent interference with the second hose 146b, a hose guide groove 142b may be provided at one side surface of the connection tube 142a. By providing the hose guide grove 142b in a recessed form at one side surface of the connection tube 142a so as to correspond to an external surface of the second hose 146b, it may be possible for the second tube 146b to avoid an interference with the connection tube 142a when the second hose 146b is inserted into the insertion hole 142c at an upper portion of the connection tube 142a. The hose guide groove 142b may have a uniform width in the upper and lower directions (gravity direction) and formed to be rounded inwardly from the outside.

The water discharge faucet 140 may be inserted to protrude right downwardly through the through hole formed at a bottom surface of the water discharge port 111.

The water discharge faucet 140 may include a plurality of coupling parts 147 that are formed to protrude to both sides of the side surface of the upper end of the faucet body 1411. The plurality of coupling parts 147 may be provided to fix the water discharge faucet 140 to an inside of the water discharge port 111. The coupling parts 147 may be formed in the shape of ring. Each of the coupling part 147 may include a coupling hole. The coupling part 147 may be provided at two or more places to prevent the water discharge faucet 140 from rotating at its place.

The coupling unit 147 may be coupled to a coupling portion that is protruded at the water discharge port 111 by screws through coupling holes, thereby preventing the water discharge faucet 140 from moving or rotating at its place.

The coupling part 147 may include a hose holder 143 formed to protrude backwardly at an upper side surface of the faucet body 141. The hose holder 143 may be provided to fix the second hose 146b. The hose holder 143 may be formed to enclose the second hose 146b.

The hose holder 143 may include a holder base 143a and a holder rib 143b.

The holder base 143b may be formed to have a curvature identical to an external circumference of the second hose 146b so as to enclose a partial side surface of the second hose 146b. A support rib may be formed at a right downward side of the holder base 143a. The support rib may be integrally coupled to the faucet body 141 such that the holder base 143a may be supported to an external surface of the faucet body 141.

The holder rib 143b may be formed to face the holder base 143a and may have a curvature identical to an external circumference of the second hose 146b. The holder rib 143b may include a hose insertion space with the holder base 143a therewithin so as to enclose an external circumference of the second hose 146b.

An opening may be provided between the holder rib 143b and the holder base 143a such that the second hose 146b may be inserted therethrough or detached from the hose insertion space.

When coupling the second hose 146b to the second faucet part 1412, the second hose 146b may be inserted and coupled to the second faucet part 1412 through the insertion hole 142c and the second through hole 145b in the gravity direction, and the second hose 146b may be coupled to an upper portion of the upper cover 142 in the form of bent at a right angle (substantially rounded and bent at a right angle) (refer to FIG. 7).

The holder rib 143b and the holder base 143a may have an elasticity. To insert an external circumference of the second hose 146b into an opening formed on an upper portion of the holder rib 143b and the holder base 143a, the holder rib 143b and the holder base 143a should be widened broader than the outer diameter of the second hose 146b. And the holder rib 143b and the holder base 143a should be restored into their original state so as to enclose the second hose 146b such that the second hose 146b may be fixed to the hose insertion space.

When coupling the second hose 146b, at first the second hose 146b is inserted and coupled to the second faucet part 1412, and then the second hose 146b is inserted and coupled to the hose insertion space of the hose holder 143.

When decoupling the second hose 146b, at first the second hose 146b may be separated from the hose insertion space of the hose holder 143, and then the second hose 146b may be pulled upwardly from the second faucet part 1412, in the opposite order of the coupling procedure.

The holder rib 143b may be formed to be shorter than the holder base 143a, and be positioned at a mid portion of the holder base 143a in the lengthwise direction. The reason why the holder rib 143b is formed to have a shorter length than the holder base 143a is that when the length of the holder rib 143b and the holder base 143a is same, it may be difficult to grasp the second hose 146b with fingers such that decoupling of the second hose 146b may be difficult. However, since the holder rib 143b is formed to be shorter than the holder base 143a, it may be possible to easily grasp the second hose 146b with the thumb and the fore finger at a front or rear side of the holder rib 143b, thereby easily decoupling the second hose 146b from the hose holder 143 by pulling upwardly.

The first faucet part 1411 may include a plurality of flow guide ribs 1411a extended in the gravity direction at its internal circumference. The flow direction of purified water or cold water introduced through the connection pipe 142a of the upper cover 142 may be changed from a horizontal direction to a vertical direction, that is bent at a right angle, causing an eddy. Such an eddy may cause purified water or cold water not to be smoothly discharged.

The flow guide ribs 1411a may be provided to protrude in the type of straight line at an internal circumference of the first faucet part 1411 along the gravity direction to guide a smooth flow of purified water or cold water in the water discharge direction. The flow guide ribs 1411a may be formed to protrude in the radial direction.

The flow guide ribs 1411a may be formed to protrude in the circumferential direction with a predetermined gap therebetween. Since the eddy is formed spirally, it is preferable to provide the plurality of flow guide ribs 1411a to be spaced apart from each other in the circumferential direction.

Figure 11:
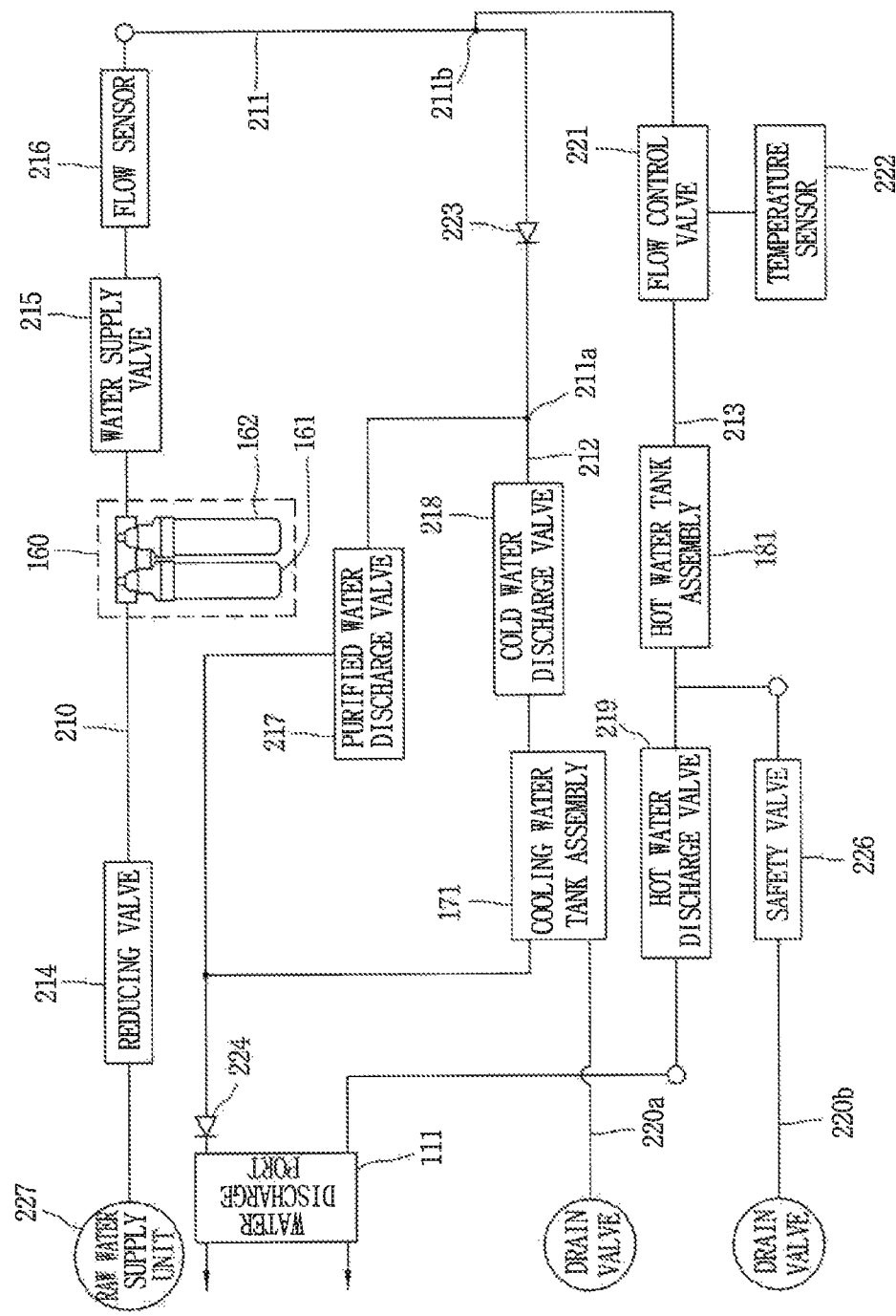
FIG. 11 is a diagram illustrating an example water flow inside an example direct water type purifier.

FIG. 11 illustrates an example water flow inside an example direct water type purifier.

The water purifier as shown in FIG. 11 may include a filter unit 160, a cooling water tank assembly 170, a hot water tank assembly 181, a water discharge faucet 140 (including a first faucet 1411 and a second faucet 1412), valves and piping, sensors, and the like.

The flow path through which water flows may be implemented by a hose or a piping. The flow path may include a raw water supply flow path 210, a purified water flow path 211, a cold water flow path 212, and a hot water flow path 213.

The raw water supply flow path 210 may be supplied with raw water from a raw water supply source like a faucet. The raw water supply flow path 210 may include a reducing valve 214 to control the pressure of raw water to be lower than a preset pressure.

The purified water flow path 211 may be coupled to the filter unit 160 so that purified water purified by the filter unit 160 may flow through the purified water flow path 211. A water supply valve 215 and a flow sensor 216 may be disposed at the purified water flow path 211. The water supply valve 215 may be configured to open or close flow of purified water supplied from the filter unit 160 to control the supply of purified water. A flow control valve may be provided to control the flow of purified water.

The cold water flow path 212 may be divided from a first division point 211a of the purified water flow path 211 and then joined to a junction of the purified water flow path 211.

The purified water discharge valve 217 may be disposed at a downstream of the first division point 211a of the purified water flow path 211. The purified water discharge valve 217 may be configured to control the supply or cutoff of purified water by opening or closing flow of the purified water flow path 211 according to a user's selection. The purified water discharge valve 217 may be distinguished from the water supply valve 215. The water supply valve 215 may be used to supply purified water to the purified water flow path 211, the cold water valve 212 and the hot water flow path 213. The purified water discharge valve 217 may be used to discharge purified water through the water discharge faucet 140.

A cold water discharge valve 218 may be disposed at the cold water flow path 212. The cold water discharge valve 218 may be disposed at the cold water flow path 212 that is divided from the first division point 211a of the cold water flow path 211. The cold water discharge valve 218 may be configured to control the supply or cutoff of purified water by opening or closing flow of the cold water flow path 212 according to a user's selection.

The hot water flow path 213 may be divided from the second division point 211b of the purified water flow path 211. The first division point 211a and the second division point 211b may be disposed to be spaced apart from one another at the purified water flow path 211, and the second division point 211b may be disposed at an upstream of the first division point 211a.

The hot water flow path 213 may include a hot water tank assembly 181, a flow control valve 221 and a temperature sensor 222. A hot water discharge valve 219 may be disposed at a rear end of the hot water tank assembly 218 to open or close the hot water flow path 213. The hot water tank assembly 218 may generate heat by an induced current induced by an induction heater 182. The flow control valve 221 may be provided to control a flow rate of purified water supplied to the hot water tank assembly 181. The temperature sensor 222 may be configured to sense a temperature of purified water to be supplied to the hot water tank assembly 181. The hot water tank assembly 181 should be small in size and a uniform amount of purified water should be supplied to the hot water tank assembly 181. Purified water or a smaller amount of purified water than cold water may be supplied to the hot water tank assembly 181.

A control module may measure a flow of purified water by receiving sensed signals from the flow sensor 216 disposed at one end, e.g., a front end, of the purified water flow path 211, and control the amount of purified water supplied to the hot water tank assembly 181 by controlling the flow control valve 221. Further, the control module may control the temperature of hot water by controlling the frequency applied to the induction heater 182 by receiving sensed signals from the temperature sensor 222.

The cooling water tank assembly 171 may be coupled to a first drain hose 220a. The first drain hose 220a may be provided to periodically replace cooling water stored in the cooling water tank assembly 171.

A second drain hose 220b may be coupled to the hot water tank assembly 181. The second drain hose 220b may be provided to discharge hot water stored in the hot water tank assembly 181 when maintenance or repair is required or in an emergency.

A safety valve 226 may be disposed at a second drain hose 220b. When steam is generated from hot water stored in the hot water tank assembly 181, the internal pressure within the hot water tank assembly 181 may rise more than a preset value. In this instance, when the pressure within the hot water tank assembly 181 rises more than a preset value, the safety valve 226 may be opened such that hot water may be discharged through the outflow port 181b of the hot water tank assembly 181.

A second check valve 223 may be disposed at one end, e.g., a front end, of the cold water flow path 212, that is, one end, e.g., a front end, of the first division point 211a. The second check valve 223 may be configured to prevent residual water of the purified water flow path 211 and the cold water flow path 212 due to a pressure change of the cold water flow path 212 from dropping from the first faucet part 1411.

The purified water flow path 211, the cold water flow path 212 and the hot water flow path 213 may be coupled to the raw water supply flow path 210 of a single line, and the cold water flow path 212 and the hot water flow path 213 may be coupled to the purified water 211 of a single line.

By such a flow path connection configuration, assuming that the second check valve 223 is not disposed, when discharging hot water, water remaining in the purified water flow path 211 and the cold water flow path 212, disposed at one end, e.g., a front end, of the purified water discharge valve 217 and the cold water discharge valve 218, may flow to the hot water flow path 213, thereby opening the purified water discharge valve 217 and the cold water discharge valve 218 when purified water flows to the hot water tank assembly 181 through the hot water flow path 213, since the purified water discharge valve 217 and the cold water discharge valve 218 are operated by a pressure change of the flow path.

Thus, when the purified water discharge valve 217 and the cold water discharge valve 218 are opened, residual water at the purified water flow path 211 and the cold water flow path 212 at the rear end of the purified water discharge valve 217 and the cold water discharge valve 218 may be dropped through the first faucet part 1411.

In some implementations, to prevent water drops of residual water through the first faucet part 1411, the first check valve 211 may be disposed at the purified water flow path 211 that is disposed at one end, e.g., a front end, of the purified water discharge valve 217 and the cold water discharge valve 218. Thus, discharging hot water may not cause a pressure change at the purified water flow path 211 at the front end of the purified water discharge valve 217 and the cold water flow path 212 at the front end of the cold water discharge valve 218.

In some implementations, a first check valve 224 may be disposed at the purified water flow path 211 at the front end of the first faucet part 1411.

The control module may control the purified water discharge valve 217 and the cold water discharge valve 218 to open or close when discharging purified water, cold water and hot water. When the purified water discharge valve 217 or the cold water discharge valve 218 are abruptly closed, a pressure change may occur at the purified water flow path 211 at the front end of the purified water discharge valve 217 and the cold water flow path 212 at the front end of the cold water discharge valve 218.

This may cause residual water, remaining in the purified water flow path 211 at the front end of the purified water discharge valve 217 and the cold water flow path 212 at the front end of the cold water discharge valve 218, to drop from the first faucet part 1411.

In some implementations, to prevent water drops from the first faucet part 1411, a check fitting part 225 may be disposed at a first hose 146a where the purified water flow path 211 and the cold water flow path 212 are joined. The check fitting part 225 may include a first check valve 224.

The first check valve 224 may be configured to limit water flow in the discharge direction of purified water and cold water. By this, though a pressure change occurs at the purified water flow path 211 at the rear end of the purified water discharge valve 217 and the cold water flow path 212 at the rear end of the cold water discharge valve 218, residual water may not be influenced by the pressure change so that residual water does not drop through the first faucet part 1411.

The control module may control valves such as the water supply valve 215, the purified water discharge valve 217, the cold water discharge valve 218 and the hot water discharge valve 219.

The control module may be configured to control the water supply valve 215 to close earlier to the purified water discharge valve 217 or the cold water discharge valve 218, or to control the water supply valve 215 to open later than the purified water discharge valve 217 or the cold water discharge valve 218 to reduce a pressure change within the flow path when discharging water.

Thus, the check fitting part 225 disposed at one end, e.g., a front end, of the water discharge faucet 140 may include the first check valve 224 inside the check fitting part 225 so that residual water remaining in one end, e.g., a front end, of the water discharge faucet 140 may not be influenced by the pressure change of the cold water flow path 212 by the first check valve 224 even when the cold water discharge valve 218 is abruptly closed. Thus, residual water is not dropped from the water discharge faucet 140.

Further, since residual water does not drop from the water discharge faucet 140 when discharging hot water, it is possible to enhance the reliability of the products to the consumer.

Further, since residual water does not drop from the water discharge faucet 140 when discharging hot water, it is possible to secure the user's desired temperature of hot water.

Further, since the purified water and cold water flow path 212 and the hot water flow path 213 are divided from the purified water flow path 211 so that purified water and cold water and hot water may be discharged without any influence from one another, it is possible to secure the user's desired temperature of discharged cold water and hot water.

For instance, as hot water instantaneously heated is discharged through a hot water hose, it is possible to drink water at desired temperature without influence by residue water remaining in the purified water flow path 211 and the cold water flow path 212. Thus, it is possible to solve a user's dissatisfaction encountered in the conventional art by producing hot water at a user's desired temperature.

Further, as cold water may be discharged through the first faucet part 1411 divided separately from the hot water hose, it is possible to drink cold water at a user's desired temperate without being influenced by hot water remaining in the hot water flow path 213.

Further, as the cold water discharge port (the first faucet part 1411) and the hot water discharge port are divided separately, but formed in a single water discharge port 111, that is, within one faucet body 141, it is possible to manufacture the water purifier main body in a slim size so as to utilize the space around the water purifier main body in the kitchen.

Further, as a direct water type water purifier in which water is discharged through a flow path as necessary without storing cold water or purified water in a tank, the purified water or cold water tank is not required so that the water purifier may be manufactured in a small size and since hot water or cold water is not stored in a tank, there may be no sanitary problem caused by residual water in the water tank.

Further, as the induction heater 182 may be adapted to the water purifier to instantaneously heat purified water by induction heating, it is possible to drink hot water at a user's desired temperature by controlling the temperature of hot water through the frequency control.

Further, as the purified water and cold water discharge port (e.g., the first faucet part 1411) and the hot water discharge port (e.g., the second faucet part 1412) are disposed at the front and rear sides of the water discharge port 111 in the lengthwise direction, the cold water discharge port and the hot water discharge port may be disposed at the center of the water purifier without deviation to the left of right viewed from a user's eye, thus may be seen as cold water and hot water are discharged through a single port.

Further, since the diameter of the hot water hose is reduced to be smaller than that of the cold water hose, there may be a little influence by residual water remaining in the hot water hose when discharging hot water so as to discharge hot water at a desired temperature.

Further, since the hot water tank can be embodied in the type of a slim plate, the installation space within the water purifier can be compact, and since the water storage space within the hot water tank can be reduced, it is possible to discharge hot water within a short time.

The invention claimed is:
1. A water purifier comprising:
a filter unit that is configured to purify water;
a purified water flow path that is coupled to the filter unit and that is configured to guide purified water;
a cold water flow path that is divided from a first division point of the purified water flow path;
a cooling unit that is located at the cold water flow path and that is configured to cool water purified by the filter unit using cooling water;
a hot water flow path that is divided from a second division point of the purified water flow path, the second division point being located upstream of the first division point;
a heating unit that is located at the hot water flow path and that is configured to heat water purified by the filter unit;
a cold water discharge valve that is located between the first division point and the cooling unit at the cold water flow path and that is configured to, based on a pressure change in the cold water flow path, control water flow inside the cold water flow path;
a main body that extends in a vertical direction and accommodates the filter unit, the cooling unit, and the heating unit therein;
a water discharge unit assembly that comprises a rotation part and a water discharge unit extending in a front direction from the rotation part to an outside of the water purifier, the rotation part being configured to rotate the water discharge unit in left and right directions about a center line of the rotation part within a predetermined angle, the center line extending parallel to the vertical direction of the main body;
a first check valve located between the cooling unit and the water discharge unit and configured to block water flow inside the cold water flow path; and
a second check valve that is installed at the purified water flow path, that is located between the first division point and the second division point, and that is configured to control water flow inside the purified water flow path.

2. The water purifier of claim 1, further comprising:
a check fitting unit that is coupled to a first side of the water discharge unit and that is configured to block a pressure change in the cold water flow path.

3. The water purifier of claim 2, further comprising:
a cooling water tank assembly that is coupled to the cooling unit and that is configured to store cooling water to cool water purified by the filter unit.

4. The water purifier of claim 2, wherein the heating unit comprises:
a hot water tank assembly that is configured to store hot water; and
an induction heater that includes a working coil and that is configured to inductively heat water in the hot water tank assembly using the working coil, and
wherein the hot water flow path couples the purified water flow path to the water discharge unit and through which hot water heated by the hot water tank assembly passes.

5. The water purifier of claim 4, further comprising:
a control module that is configured to control a frequency of the induction heater to control a discharge temperature of hot water.

6. The water purifier of claim 5, further comprising:
a water supplying valve (i) that is configured to control a flow of water that is purified by the filter unit and (ii) that is located at a first side of the filter unit.

7. The water purifier of claim 6, further comprising:
a purified water discharge valve that is installed at the purified water flow path, that is located downstream of the first division point, and that is configured to, based on a pressure change in the purified water flow path, control water flow inside the purified water flow path,
wherein the control module is configured to control timings to open or close the water supplying valve, the purified water discharge valve, and the cold water discharge valve.

8. The water purifier of claim 7, wherein the control module is configured to (i) close the water supplying valve earlier than closure of the purified water discharge valve or the cold water discharge valve and (ii) open the water supplying valve later than opening of the purified water discharge valve or the cold water discharge valve.

9. The water purifier of claim 6, wherein the first side of the filter unit is an output side of the filter unit.

10. The water purifier of claim 2, further comprising:
a purified water discharge valve that is installed at the purified water flow path, that is located downstream of the first division point, and that is configured to, based on a pressure change in the purified water flow path, control water flow inside the purified water flow path,
wherein the cold water flow path is connected to a rejoin point of the purified water flow path between the purified water discharge valve and the water discharge unit.

11. The water purifier of claim 10, wherein the rejoin point of the purified water flow path is located between the water discharge unit and the first division point.

12. The water purifier of claim 1, wherein the water discharge unit includes:
a faucet body;
a first faucet part that is located inside the faucet body and that is coupled to an output water flow path at which the cold water flow path and the purified water flow path join together; and
a second faucet part that is located inside the faucet body and that is coupled to the hot water flow path.

13. The water purifier of claim 1, wherein the cooling unit includes a cooling coil.

14. The water purifier of claim 1, wherein the second check valve is configured to prevent residual water in the purified water flow path and the cold water flow path from being discharged through the water discharge unit.

15. The water purifier of claim 1, wherein the water purifier is a direct water type purifier that is configured to directly discharge water outside of the water purifier without storing the water in a water tank.

16. A water purifier comprising:
a water supply flow path that is configured to guide water and through which water is provided;
a filter unit that is coupled to the water supply flow path and that is configured to purify water provided from the water supply flow path;
a purified water flow path that is coupled to the filter unit and that is configured to guide water purified by the filter unit;
a cold water flow path that is coupled to the purified water flow path and that is configured to guide a first portion of water from the purified water flow path,
a hot water flow path that is coupled to the purified water flow path and that is configured to guide a second portion of water from the purified water flow path;
a 3-directions connection pipe (i) that is coupled to the purified water flow path and configured to receive purified water from the purified water flow path, (ii) that is coupled to the cold water flow path and configured to receive cold water from the cold water flow path, and (iii) that couples the purified water flow path and the cold water flow path to a single output water flow path and configured to provide the purified water and the cold water to the single output water flow path;
a water discharge faucet that accommodates the single output water flow path and the hot water flow path, that is configured to receive the purified water and the cold water provided through the single output water flow path, and that is configured to receive hot water provided through the hot water flow path;
a main body that extends in a vertical direction and accommodates the filter unit therein; and
a water discharge unit assembly that comprises a rotation part and a water discharge unit extending in a front direction from the rotation part to an outside of the water purifier, the rotation part being configured to rotate the water discharge unit in left and right directions about a center line of the rotation part within a predetermined angle, the center line extending parallel to the vertical direction of the main body,
wherein the water discharge unit comprises:
a first tube that defines a flow path connected to both of the purified water flow path and the cold water flow path, and
a second tube that is separate from the first tube and that is connected to the hot water flow path.

17. The water purifier of claim 16, wherein the cold water flow path is divided from a first division point of the purified water flow path, and the hot water flow path is divided from a second division point of the purified water flow path disposed upstream of the first division point, and
wherein the water purifier further comprises:
a first check valve that is coupled to the single output water flow path and that is configured to control water flow inside the single output water flow path; and a second check valve that is coupled to a portion of the purified water flow path between the first division point and the second division point, and that is configured to control water flow inside the purified water flow path.

18. The water purifier of claim 16, wherein the water discharge faucet is disposed downstream of the 3-directions connection pipe.

19. The water purifier of claim 16, wherein the 3-directions connection pipe comprises:
- a first inlet coupled to the purified water flow path and configured to receive purified water from the purified water flow path;
- a second inlet coupled to the cold water flow path and configured to receive cold water from the cold water flow path; and
- an outlet coupled to the single outlet water flow path and configured to provide the purified water and the cold water to the single output water flow path.

20. The water purifier of claim 19, wherein the hot water flow path extends to the single outlet water flow path and connects to a position of the single outlet water flow path downstream of the outlet of the 3-directions connection pipe.

* * * * *